United States Patent [19]

Clark

[11] 3,960,244

[45] June 1, 1976

[54] CLOTH CUTTING MACHINE WITH WICK LUBRICATOR

[75] Inventor: Frederick G. Clark, Naples, Fla.

[73] Assignee: Eastman Machine Company, Buffalo, N.Y.

[22] Filed: Sept. 16, 1974

[21] Appl. No.: 506,013

[52] U.S. Cl. .................... 184/6.14; 30/123; 184/65; 184/102; 184/7 R; 184/5

[51] Int. Cl.² ............................................. F01M 1/00

[58] Field of Search ............... 184/7 R, 16, 19, 22, 184/25, 65, 81, 102, 6.15, 6.14, 5; 30/123 R, 123.3; 51/246

[56] References Cited
UNITED STATES PATENTS

| 1,416,339 | 5/1922 | Dexter | 184/102 |
| 1,426,918 | 8/1922 | Shover | 184/102 |
| 1,901,691 | 3/1933 | Aull | 184/65 |
| 2,869,231 | 1/1959 | Gury | 30/123 |
| 2,951,557 | 9/1960 | Jung | 184/102 |
| 3,033,312 | 5/1962 | Enders | 184/102 |
| 3,119,461 | 1/1964 | Enders | 184/102 |
| 3,198,287 | 8/1965 | Lyden | 184/102 |
| 3,254,740 | 6/1966 | Bond | 184/6.15 |

Primary Examiner—Richard C. Pinkham
Assistant Examiner—Marvin Siskind
Attorney, Agent, or Firm—Joseph P. Gastel

[57] ABSTRACT

A cloth cutting machine having an improved lubrication system therein including a motor mounted on the machine housing for driving a crosshead supported in a crosshead guide through link means, and a lubricant reservoir positioned above the crosshead and having a plurality of wicks emanating therefrom for conducting lubricant to areas of contact between the crosshead and the crosshead guide and between the crosshead and the linkage which drives it.

7 Claims, 4 Drawing Figures

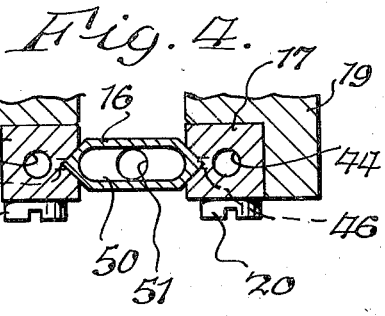
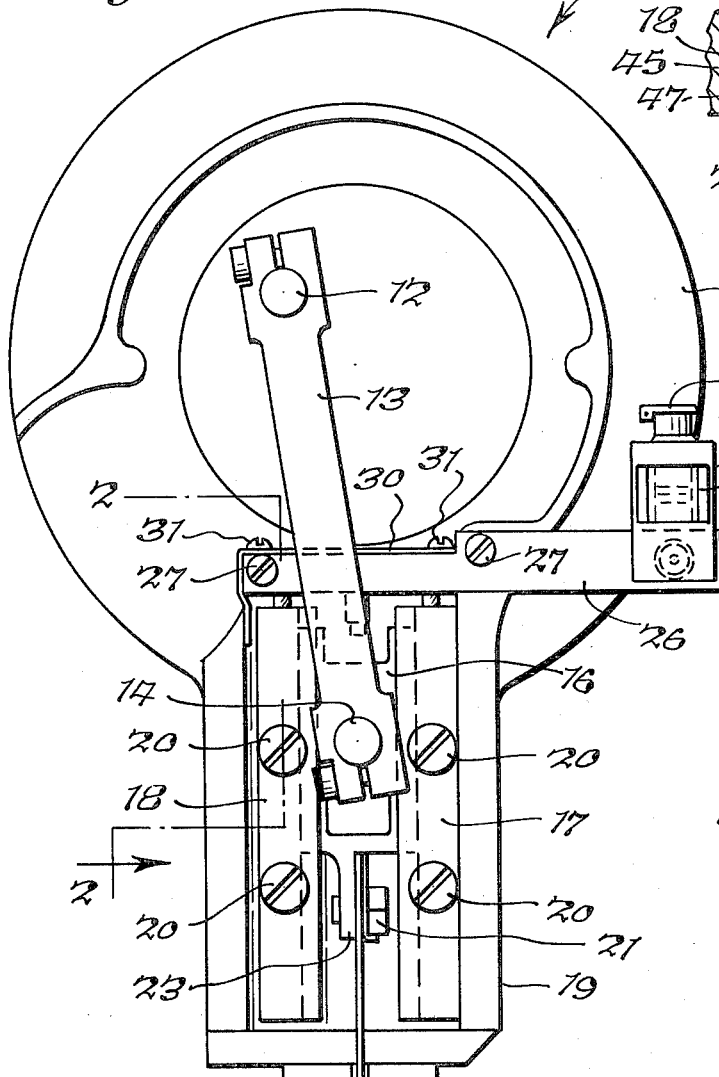
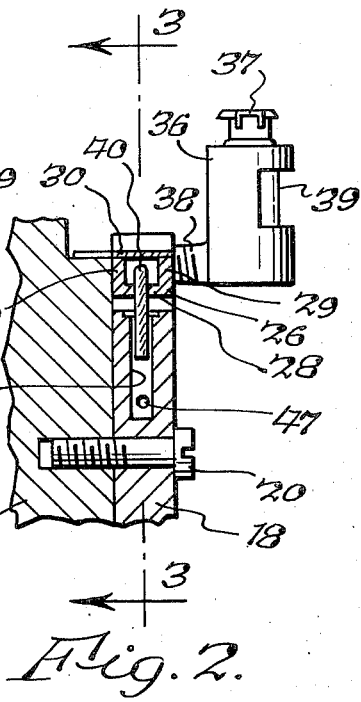
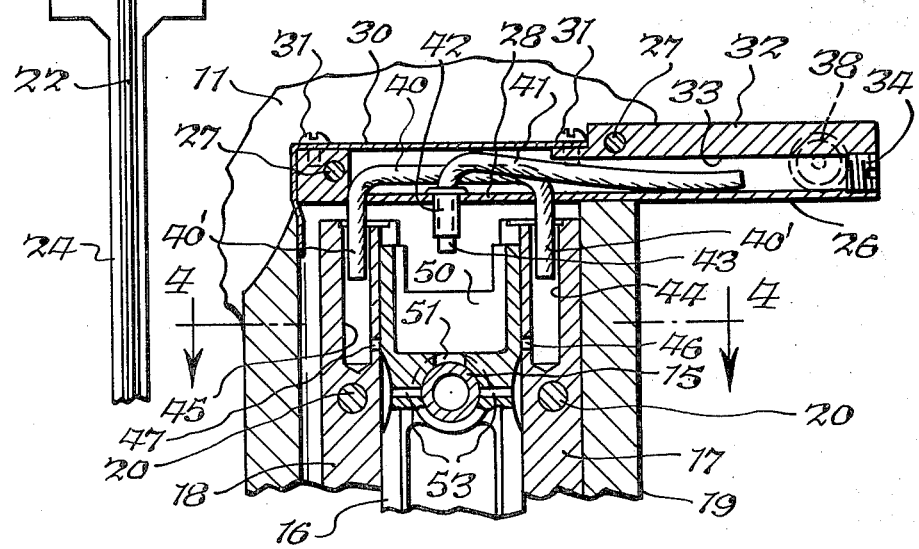

CLOTH CUTTING MACHINE WITH WICK LUBRICATOR

The present invention relates to a cloth cutting machine having an improved lubrication system therein.

By way of background, in a cloth cutting machine having a reciprocatory knife, it is necessary to convert the rotary motion of an electric motor to the reciprocating motion of the knife. To accomplish this, a crosshead is provided which is driven in a reciprocatory manner through a crank, and the crosshead is guided in its reciprocatory movement by a pair of guides. In the past, lubrication of the crosshead-crosshead guide area and the wrist pin on the crosshead was effected through a plurality of different oiling cups. This required filling of a plurality of separate cups, and thus there was a possibility that the maintenance person charged with filling the plurality of lubricant cups might skip one or more of them and thus permit an area in the machine to run dry. Furthermore, the plurality of oiling cups required a plurality of conduits associated therewith which caused the structure to be relatively complex. In addition, because the flow of lubricant to the desired areas was through conduits having predetermined apertures, there was the possibility that if the conduits became clogged, the flow rates would decrease. It is with overcoming the foregoing deficiencies of prior art machines that the present invention is concerned.

It is accordingly one important object of the present invention to provide an improved lubrication system for a cloth cutting machine in which a plurality of points on the machine are lubricated from a single source through the use of wicks emanating from a single lubricant reservoir.

Another object of the present invention is to provide an improved lubricating system for a cloth cutting machine in which the flow of lubricant can be very closely controlled as may be required for optimum lubrication of the parts.

A further object of the present invention is to provide an improved lubrication system for a cloth cutting machine which is relatively simple in construction and dependable in operation. Other objects and attendant advantages of the present invention will readily be perceived hereafter.

The cloth cutting machine of the present invention having the improved lubrication system comprises a housing, motor means on said housing, a crosshead, crosshead guide means for supporting said crosshead for reciprocatory movement, link means coupled between said motor means and said crosshead for driving said crosshead, knife means coupled to said crosshead, a lubricant reservoir positoned above said crosshead, and wick means in said lubricant reservoir for conducting lubricant to various points on said crosshead. The various aspects of the present invention will be more fully understood when the following portions of the specification are read in conjunction with the accompanying drawings wherein:

FIG. 1 is a fragmentary side elevational view, with parts removed, of certain portions of the drive mechanism of a cloth cutting machine having the improved lubrication system of the present invention associated therewith;

FIG. 2 is a fragmentary cross sectional view taken substantially along line 2—2 of FIG. 1 and showing certain details of the lubrication system;

FIG. 3 is a fragmentary cross sectional view taken substantially along line 3—3 of FIG. 2 and showing further details of the lubrication system; and FIG. 4 is a fragmentary sectional view taken substantially along line 4—4 of FIG. 3 and showing the manner in which the crosshead is mounted between the crosshead guides.

The improved cloth cutting machine 10 may be of the general type shown in U.S. Pat. No. 3,775,913 and includes a housing 11 mounting a suitable electric motor (not shown) which drives crank pin 12 on which the upper end of link 13 is suitably journalled. The lower end of the link 13 is journalled on one portion of wrist pin 14 having another portion 15 on which crosshead 16 is journalled for reciprocatory movement in crosshead guides 17 and 18 which are secured to housing portion 19 by means of screws 20. A suitable pin member 21 secures knife blade 22 to tab 23 forming the lowermost portion of crosshead 16. Through the foregoing linkage, knife 22 is caused to reciprocate in guide 24 extending downwardly from housing portion 19.

In order to insure proper lubrication of crosshead 16 and wrist pin 14 as knife 22 is caused to reciprocate, the improved lubrication system of the present invention has been developed. In this respect, a reservoir 26, which is fabricated from a block of metal, is secured to housing 11 by means of screws 27, as shown in FIGS. 1 and 3. A portion of reservoir 26 is in the configuration of a U-shaped channel (FIG. 2) having bottom wall 28 and upstanding side walls 29. A cover plate 30 is secured to the left hand portion of reservoir 26 by means of screws 31. The portion 32 of reservoir 26 to the right of cover plate 30 is square in outer dimension and has a bore 33 therein which is in communication with the portion of the reservoir under cover plate 30 (FIG. 3). A screw plug 34 is inserted in the right end of bore 33 to seal it.

An oil cup 36 is provided having a conventional spring cap 37 thereon which is opened when cup 36 is to be filled. The lower end of oil cup 36 includes a threaded stem 38 which is threaded into a suitable tapped aperture in reservoir portion 32. The front of oil cup 36 includes a sight glass 39 which permits viewing of the level of oil in cup 36. It will be appreciated that when the level falls below sight, the cup should be refilled, notwithstanding that there still may be oil in the reservoir 26.

The oil or lubricant in reservoir 26 is conveyed to the various parts of the crosshead and the crosshead guide by means of wicks 40 and 41. In this respect, wick 41 includes a first portion located within reservoir 26 and a second portion which extends through fitting 42 so that the free end 43 of wick 41 is centrally located above crosshead 16. The opposite end portions 40' of a second wick 40 extend through suitable apertures in the bottom wall 28 of reservoir 26 and extend into bores 44 and 45 of crosshead guides 17 and 18, respectively. Transverse conduits 46 and 47 are in communication with bores 44 and 45, respectively, and terminate at the V-shaped surfaces (not numbered) of crosshead guides 17 and 18, respectively (FIG. 4). It can thus be seen that lubricant passes through the ends 40' of wick 40 into bores 44 and 45 and then to the surfaces of crosshead guides 17 and 18 on which crosshead 16 reciprocates.

A conduit or well 50 is provided in crosshead 16 and this conduit is directly below the lower end 43 of wick 41. Therefore, lubricant passing through wick 41 will drop into well 50 and pass through lower conduit 51 in communication therewith to lubricate wrist pin 15 so as to provide lubrication between this pin and crosshead 16, as well as between this pin and lower end of link 13. Horizontal holes 53 which are in communciation with well 50 also feed lubricant to the crossheadguide area.

By the use of the above described lubrication system, a single oil cup is used to conveniently lubricate a plurality of spaced parts of a cloth cutting machine. Furthermore, by using the wicks instead of direct oil flow, any desired degree of control over oil flow can be obtained. In this respect, certain of the wicks may be low density wicking which will provide a relatively fast flow. Other wicks may be of relatively high density to provide a relatively slow flow. In addition, the size of the orifices through which the wicking passes can be varied as desired to control the rate of flow through the wicking. Thus, extremely close control of oil flow can be obtained in an extremely positive manner from a single source to a plurality of different points on the machine without the use of conventional conduits. In addition it is to be especially noted that the wicking is not used in its conventional sense to act as a capillary by raising the lubricant. The wicking acts in the form of a conduit through which the lubricant flows by gravity. The wicking does not contact any of the moving parts of the machine and therefore the possibility of glazing of the wick due to contact with a moving part, or seizing of the part by the wick is obviated. In addition, because the oil flow is through wicks rather than an orifice, it is highly unlikely that any impurities in the lubricant in the reservoir will clog the orifices because such impurities will settle on the outside of the wicks and it is highly unlikely that such impurities will cover the entire surfaces of any of the wicks. Thus, the wicks will act as combined conduits and lubricant filters.

It can thus be seen that the improved lubricant system of the present invention is manifestly capable of achieving the above enumerated objects and while a preferred embodiment of the present invention has been disclosed, it will be readily understood that the present invention is not limited thereto but may be otherwise embodied within the scope of the following claims.

What is claimed is:

1. A cloth cutting machine comprising a housing, motor means on said housing, a crosshead, a pair of spaced crosshead guide means for supporting said crosshead for reciprocatory movement, link means coupled to said motor means, wrist pin means coupled between said link means and said crosshead, knife means coupled to said crosshead, a lubricant reservoir positioned above said crosshead, and wick means in communication with said lubricant reservoir functioning as conduit means for simultaneously conducting lubricant to both said crosshead guide means and said wrist pin means by gravity feed without any relative sliding contact between said wick means and said crosshead guide means and said wrist pin means which are to receive lubricant from said wick means.

2. A cloth cutting machine as set forth in claim 1, wherein said crosshead guide means includes conduit means therein for receiving an end of said wick means remote from said lubricant reservoir and conducting lubricant from said wick means to the area of engagement between said crosshead guide means and said crosshead.

3. A cloth cutting machine as set forth in claim 2 wherein said crosshead includes second conduit means therein for receiving lubricant from said wick means and conducting said lubricant to said wrist pin means.

4. A cloth cutting machine as set forth in claim 3 wherein said crosshead includes third conduit means therein for conducting lubricant from said second conduit means to the area of engagement between said crosshead and said crosshead guide means.

5. A cloth cutting machine as set forth in claim 2 wherein said crosshead guide means comprises first and second substantially parallel guide members positioned on opposite sides of said crosshead, and wherein said conduit means comprises first and second conduits in said first and second guide members, respectively, and wherein said wick means comprises first and second wicks extending into said first and second conduits, respectively.

6. A cloth cutting machine as set forth in claim 5 wherein each of said first and second conduits include a first bore extending substantially lengthwise in each of said guides, and a second bore in communication with said first bore and extending transversely thereto.

7. A cloth cutting machine as set forth in claim 5 wherein said crosshead includes a third conduit therein, a third wick for conducting lubricant from said reservoir to said third conduit for lubricating said wrist pin means.

* * * * *